US007956587B2

United States Patent
Kawase et al.

(10) Patent No.: US 7,956,587 B2
(45) Date of Patent: Jun. 7, 2011

(54) POWER SUPPLY APPARATUS (75) Inventors: Yoshiyuki Kawase, Nagoya (JP); Toru Itabashi, Anjo (JP)

(73) Assignee: Denso Corporation, Kariya (JP)

( * ) Notice: Subject to any disclaimer, the term of this patent is extended or adjusted under 35 U.S.C. 154(b) by 444 days.

(21) Appl. No.: 12/120,860

(22) Filed: May 15, 2008

(65) Prior Publication Data
US 2008/0284389 A1 Nov. 20, 2008

(30) Foreign Application Priority Data
May 16, 2007 (JP) .................. 2007-130765

(51) Int. Cl.
G05F 1/577 (2006.01)
G05F 1/571 (2006.01)
(52) U.S. Cl. ...................... 323/267; 323/276
(58) Field of Classification Search .............. 323/266, 323/267, 268, 270, 273, 276, 282, 283
See application file for complete search history.

(56) References Cited

U.S. PATENT DOCUMENTS

| | | | |
|---|---|---|---|
| 4,777,626 A | 10/1988 | Matsushita et al. | |
| 5,968,178 A | 10/1999 | Williams et al. | |
| 6,215,287 B1 | 4/2001 | Matsushiro et al. | |
| 6,850,047 B2 * | 2/2005 | Itabashi et al. | 323/284 |
| 7,038,430 B2 * | 5/2006 | Itabashi et al. | 323/224 |
| 7,057,378 B2 | 6/2006 | Oyama et al. | |
| 7,068,485 B2 * | 6/2006 | Ishikawa et al. | 361/93.9 |
| 7,106,031 B2 * | 9/2006 | Hayakawa et al. | 323/224 |
| 7,586,296 B2 * | 9/2009 | Kanayama | 323/282 |
| 2002/0129286 A1 | 9/2002 | Kubota et al. | |
| 2002/0180497 A1 | 12/2002 | Kim | |

FOREIGN PATENT DOCUMENTS

| | | |
|---|---|---|
| EP | 0186832 | 7/1986 |
| JP | 62-006315 | 1/1987 |

(Continued)

OTHER PUBLICATIONS

Japanese Office Action dated Mar. 17, 2009, issued in corresponding Japanese Application No. 2007-130765, with English translation.

(Continued)

*Primary Examiner* — Adolf Berhane
(74) *Attorney, Agent, or Firm* — Nixon & Vanderhye P.C.

(57) ABSTRACT

A power supply apparatus that supplies an operating voltage to a microcomputer reliably resets the microcomputer before operation becomes unstable when an external power supply voltage decreases due to interruption. A switching regulator and series regulators are included. An externally supplied power supply voltage is stepped down to generate an intermediate voltage. The intermediate voltage is stepped down to generate an operating voltage for a microcomputer core. The intermediate voltage is stepped down to generate an operating voltage for an I/O port. When the intermediate voltage becomes lower than a reset determining voltage, the power supply apparatus outputs a reset signal to the microcomputer. When the power supply voltage decreases, the microcomputer can be reliably reset and the core can be prevented from operating erratically before the voltage becomes lower than a minimum core operating voltage.

19 Claims, 5 Drawing Sheets

FOREIGN PATENT DOCUMENTS

| | | |
|---|---|---|
| JP | 07-095765 | 4/1995 |
| JP | 08-063405 | 3/1996 |
| JP | 2000-222051 | 8/2000 |
| JP | 2002-024101 | 1/2002 |
| JP | 2002-158572 | 5/2002 |
| JP | 2004-153931 | 5/2004 |
| JP | 2005-188939 | 7/2005 |
| JP | 2005-303426 | 10/2005 |

OTHER PUBLICATIONS

Japanese Office Action dated Dec. 16, 2008 issued in corresponding Japanese Application No. 2007-130765, with English translation.

Extended European Search Report (10 pgs.) dated Dec. 21, 2010 issued in corresponding European Application No. 08009033.5-1245.

* cited by examiner

POWER SUPPLY APPARATUS

CROSS REFERENCE TO RELATED APPLICATIONS

The present application is based on and claims priority to Japanese Patent Application No. JP 2007-130765, filed May 16, 2007 the contents of which are incorporated in their entirety herein.

BACKGROUND OF THE INVENTION

1. Field of the Invention

The invention relates to a power supply apparatus for supplying an operating voltage to a microcomputer.

2. Description of Related Art

Conventionally, an electronic control unit (ECU) mounted on an automobile or a vehicle uses a microcomputer to execute various processes for providing control. In recent years, microcomputers used for onboard ECUs are increasingly requested to operate faster in accordance with the increase in sophistication of the control requirements. Accordingly, the increased performance requirements for a microcomputer of an ECU necessitate that an internal core operate at a voltage, such as 1.2 V, that is lower than an input/output (I/O) port or an I/O circuit that interchanges signals with external circuits.

A power supply apparatus for supplying an operating voltage to the microcomputer is provided with a function of outputting a reset signal to the microcomputer so as to prevent a malfunction due to a decreased operating voltage supplied to the core of the microcomputer.

Figure 4:
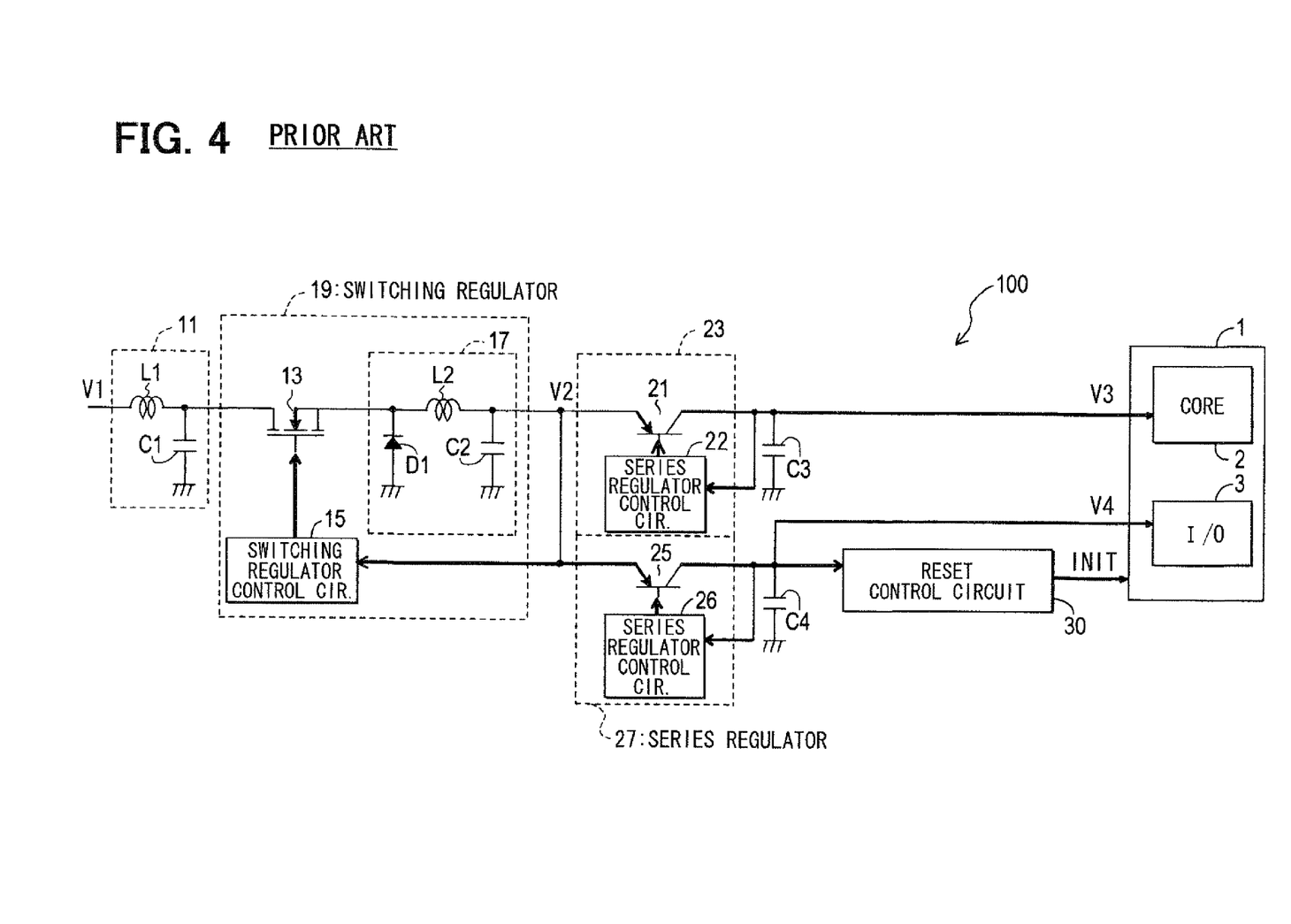
FIG. 4 is a circuit diagram illustrating the construction of a conventional power supply apparatus.

FIG. 4 shows an example of a conventional type of power supply apparatus. A power supply apparatus 100 in FIG. 4 is provided for an onboard ECU and supplies an operating voltage to a microcomputer 1 in the ECU. A battery voltage is supplied via an ignition switch or a relay, though not shown. The power supply apparatus 100 supplies the battery voltage as a power supply voltage V1 from the outside and steps down the voltage V1 to two types of constant voltages V3 and V4 for output. The voltage V3, 1.2 V in the present example, is supplied as an operating voltage to a core 2 in the microcomputer 1. The voltage V4, 5 V in the present example, is supplied as an operating voltage to an I/O port 3 in the microcomputer 1. The voltage V4 is also supplied to circuits other than the microcomputer 1 in the onboard ECU as needed. Such circuits include, for example, an input circuit for receiving a sensor signal from the outside and a drive circuit for driving an external electric load.

The power supply apparatus 100 includes a smoothing circuit 11, a switching regulator 19, a series regulator 23, a series regulator 27, a capacitor C3, a capacitor C4, and a reset control circuit 30. The smoothing circuit 11 is supplied with the power supply voltage V1 from the outside. The switching regulator 19 steps down the power supply voltage V1 to an intermediate voltage V2 such as 6 V higher than the voltage V3 or V4. The series regulator 23 steps down the intermediate voltage V2 output from the switching regulator 19 to the voltage V3. The series regulator 27 steps down the intermediate voltage V2 to the voltage V4. The capacitor C3 stabilizes the voltage V3 output from the series regulator 23. The capacitor C4 stabilizes the voltage V4 output from the series regulator 27. For example, 3P-2004-153931 A describes such a power supply apparatus including series-connected switching regulator and series regulator.

The smoothing circuit 11 includes a low-pass filter including a choke coil L1 and a capacitor C1. The switching regulator 19 includes a switching transistor 13 or metal oxide semiconductor field effect transistor (MOSFET) in the present example, a switching regulator control circuit 15, and a smoothing circuit 17. The smoothing circuit 17 includes a free wheeling diode D1, a choke coil L2, and a capacitor C2.

The series regulator 23 includes a transistor 21 for output control and a series regulator control circuit 22. Similarly, the series regulator 27 includes a transistor 25 for output control and a series regulator control circuit 26.

In the power supply apparatus 100, the smoothing circuit 11 eliminates noise components higher than a specified frequency from the power supply voltage V1. The power supply voltage V1 is then applied to the switching transistor 13 of the switching regulator 19.

The switching transistor 13 turns on or off in accordance with a control signal from the switching regulator control circuit 15. The switching transistor 13 outputs a pulse-shaped voltage. The smoothing circuit 17 transforms the pulse-shaped voltage into an almost stabilized average voltage. The switching regulator control circuit 15 monitors the voltage V2 smoothed by the smoothing circuit 17, namely the output voltage from the switching regulator 19. The switching regulator control circuit 15 turns on or off the switching transistor 13 so that the voltage V2 reaches a target value of 6 V for the intermediate voltage.

The output voltage or intermediate voltage of V2 from the switching regulator 19 is applied to emitters of the transistors 21 and 25 in the series regulators 23 and 27, respectively.

In the series regulator 23, the series regulator control circuit 22 monitors the collector voltage V3 for the transistor 21, namely the output voltage from the series regulator 23. The series regulator control circuit 22 continuously controls a base current for the transistor 21 so that the voltage V3 reaches a target value of 1.2 V for the operating voltage of the core 2.

The output voltage V3 from the series regulator 23 is output to the microcomputer 1 and is supplied as the operating voltage to the core 2 in the microcomputer 1.

In the series regulator 27, the series regulator control circuit 26 monitors the collector voltage V4 for the transistor 25, namely the output voltage from the series regulator 27. The series regulator control circuit 26 continuously controls a base current for the transistor 25 so that the voltage V4 reaches a target value of 5 V for the operating voltage of the I/O port 3.

The output voltage V4 from the series regulator 27 is output to the microcomputer 1 and is supplied as the operating voltage to the I/O port 3 in the microcomputer 1.

In the power supply apparatus 100, the reset control circuit 30 monitors the output voltage V4 from the series regulator 27. When detecting that the voltage V4 becomes lower than a specified voltage Vth as shown in FIG. 5A, the reset control circuit 30 outputs a active-low reset signal INIT to the microcomputer 1.

When the battery voltage instantaneously drops due to an electric load requiring a large amount of power, the power supply voltage V1 to the power supply apparatus 100 also drops instantaneously in the onboard ECU. The power supply voltage V1 is supplied through an ignition switch and a relay controlled in accordance with the ignition switch. When the ignition switch or the relay momentarily turns off, the power supply voltage V1 is also temporarily removed.

Figure 5A:
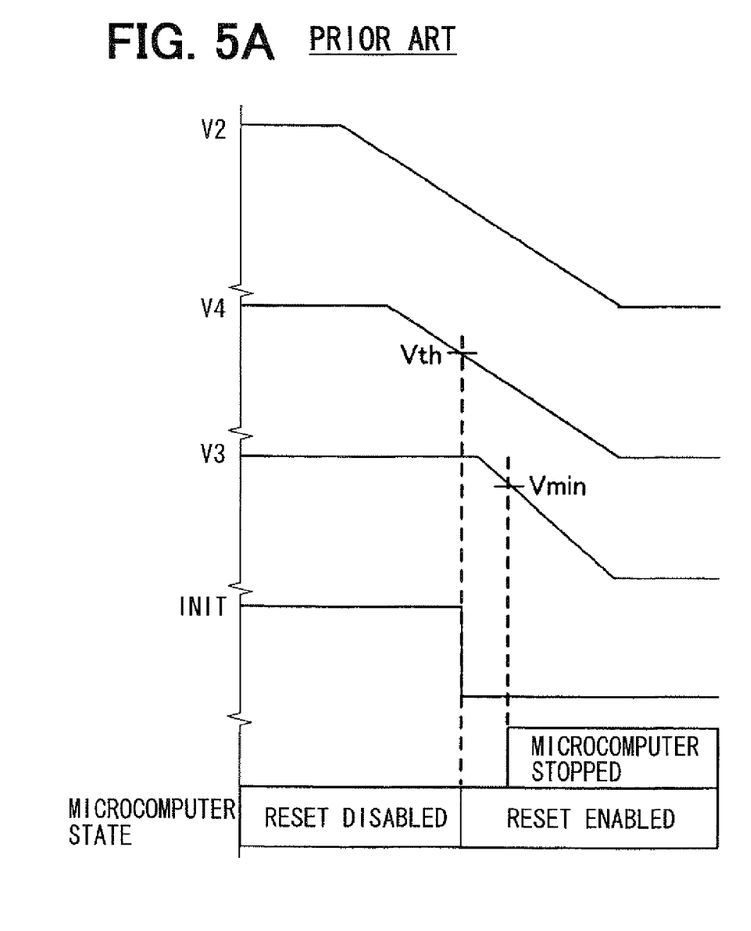
FIG. 5A is a diagram illustrating a prior art timing scenario.

When the power supply voltage V1 drops suddenly due to an instantaneous interruption, the output voltage V2 from the switching regulator 19 also decreases as shown in FIG. 5A. The output voltages V3 and V4 from the series regulators 23 and 25 also decrease accordingly. The voltage V4 decreases first because the voltage V4 is originally set to be higher than the voltage V3.

As shown in FIG. 5A, the specified voltage Vth is so configured that the voltage V4 reaches the specified voltage Vth to reset the microcomputer 1 before the voltage V3 decreases to a minimum operating voltage Vmin for the core 2 due to a decrease in the voltage V2. The minimum operating voltage for the core is equivalent to a minimum operating voltage within a normal range.

Normally, the operating voltage V3 itself supplied to the core 2 should be monitored. However, the voltage V4 is monitored because the operating voltage V3 for the core 2 is low originally. For example, let us suppose that the core 2 uses an operating voltage in a normal range of 1.2 V ±10%. The construction of monitoring the voltage V3 needs to detect a decrease of a very small voltage such as approximately 0.1 V from 1.2 V, the center value of the normal range. It is difficult to implement a voltage detection circuit capable of detecting such a small voltage change.

As the microcomputer for the onboard power supply apparatus features high-speed operations, the core increasingly lowers an operating voltage and consumes more power.

The voltage monitoring method as shown in FIGS. 4 and 5A causes a degraded microcomputer reset response to an instantaneous drop of the power supply voltage V1 and cannot achieve secure fail safe.

Figure 5B:
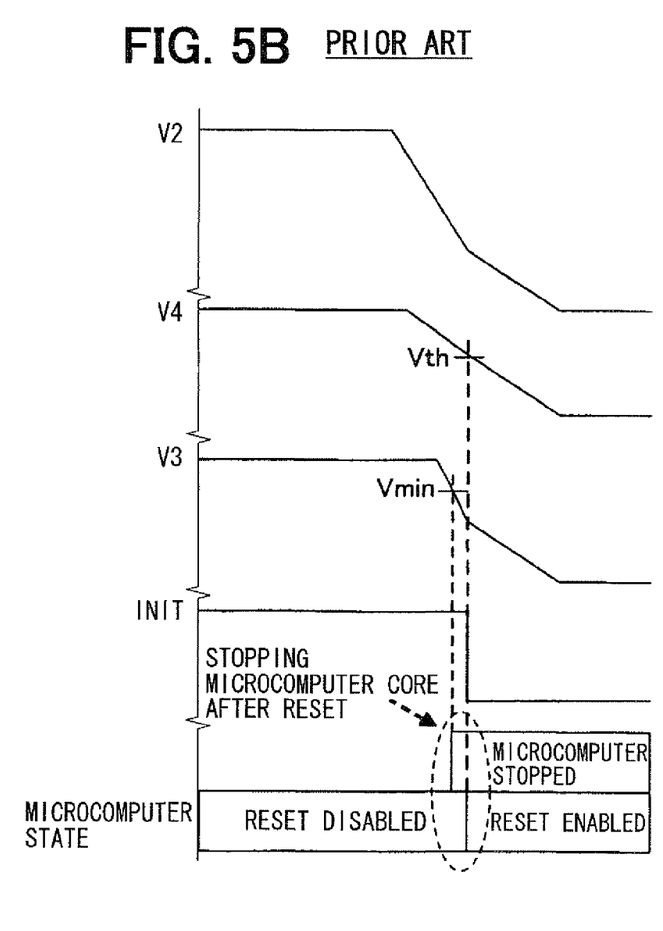
FIG. 5B is a diagram further illustrating a prior art timing scenario.

Let us suppose that the core of the microcomputer 1 in FIG. 4 consumes a large current. FIG. 5B shows that the output voltage V2 from the switching regulator 19 decreases when the power supply voltage V1 drops due to an instantaneous interruption, for example. The voltage V3 decreases more steeply than voltage V4 because the core consumes a large current. The voltage V3 becomes lower than the minimum operating voltage Vmin for the core before the voltage V4 becomes lower than the specified voltage Vth, that is, before the microcomputer is reset. A microcomputer or core operation is unstable after the voltage V3 becomes lower than the minimum operating voltage Vmin for the core until the microcomputer is reset. Accordingly, data may be destroyed. An element included in the core may operate unstably. In the worst case, the microcomputer itself may be damaged. Also, the voltage V2 in FIG. 5B decreases more steeply than in FIG. 5A because the core consumes a large current.

One way to address the above described scenarios may be to increase the capacity of the capacitor C3 for voltage stabilization in FIG. 4 and gently decrease the voltage V3. However, in such an approach, the circuit scale and costs increase rendering the technique impractical.

SUMMARY OF THE INVENTION

The present invention has been made in consideration of the foregoing. It is therefore an object of the present invention to provide a power supply apparatus that supplies an operating voltage to a microcomputer to reliably reset the microcomputer before a microcomputer operation becomes unstable when an external power supply voltage decreases due to an instantaneous interruption.

A power supply apparatus in accordance with an exemplary embodiment, includes a first regulator, a second regulator, and a fail-safe means. The first regulator steps down a power supply voltage supplied from outside the power supply apparatus to generate an intermediate voltage. The second regulator steps down the intermediate voltage output from the first regulator to generate an operating voltage for operating a core of a microcomputer, or a microcomputer core, and supplies the operating voltage to the core of the microcomputer.

The fail-safe means monitors the intermediate voltage output from the first regulator. When detecting that the intermediate voltage becomes lower than a reset determining voltage, the fail-safe means outputs a reset signal to the microcomputer so as to reset the microcomputer.

The first and second regulators are serially connected. The first regulator is positioned upstream or belongs to a preceding stage. The power supply apparatus monitors an output voltage or an intermediate voltage from the first regulator and resets the microcomputer.

It should be noted that an external power supply voltage may decrease due to an instantaneous interruption to decrease an output voltage from the first regulator. The microcomputer can be reset when the output voltage becomes lower than the reset determining voltage. It is possible to improve a response to resetting the microcomputer compared to the prior art that monitors an output voltage from a downstream regulator at the subsequent stage.

Even though the microcomputer core consumes a large current, an unstable core operation can be prevented before an output voltage from the second regulator becomes lower than the minimum operating voltage for the core. As a result, it is possible to prevent data from being destroyed or the microcomputer from being damaged.

The correlation between output voltages from the first and second regulator must be determined. The reset determining voltage is set to a value equivalent to an output voltage from the first regulator, that is, an input voltage to the second regulator. During the condition where an output voltage from the second regulator becomes slightly higher than the minimum operating voltage for the core, a reset condition is determined. The fail-safe means outputs the reset signal and then stops the second regulator.

The exemplary power supply apparatus eliminates the need for unnecessary power supply to the microcomputer, making it possible to more reliably prevent the microcomputer from operating erratically.

The power supply apparatus is advantageous in the following constructions. When the microcomputer includes standby memory or RAM that is always supplied with power. When a memory regulator other than the second regulator always supplies power to the standby memory. Note that when a power supply voltage supplied to the first regulator decreases to decrease an output voltage from the second regulator, the output voltage from the memory regulator may also decrease. When a normal range of operating voltages for the standby memory is greater than or equal to a normal range of operating voltages for the core.

The fail-safe means outputs a reset signal to the microcomputer when a power supply voltage supplied to the first regulator decreases. In such a case, the operating voltage supplied to the standby memory from the memory regulator is also assumed to decrease similarly to the operating voltage supplied to the microcomputer core. When the microcomputer is reset in such a situation, the core consumes almost no current. The operating voltage for the core decreases gently. The operating voltage supplied to the standby memory becomes lower than the operating voltage supplied to the core. A shoot-through current flows in the microcomputer from the core to the standby memory. The microcomputer may be damaged.

The construction of the exemplary power supply apparatus can reliably prevent an occurrence of the situation where the operating voltage supplied to the standby memory becomes lower than the operating voltage supplied to the core. It is possible to eliminate the possibility of damaging the microcomputer.

When detecting that the intermediate voltage becomes lower than a write inhibit determining voltage set to be higher than the reset determining voltage, the fail-safe means outputs a write inhibit signal to the microcomputer for preventing the core from writing data to specific memory. Such a construction can prevent data from being written to specific memory before the operating voltage for the microcomputer core becomes unstable, that is, before or immediately after the operating voltage decreases. It is possible to reliably prevent destruction of data stored in the specific memory.

When detecting that the intermediate voltage output from the first regulator becomes lower than a reset notification determining voltage set to be higher than the reset determining voltage, the fail-safe means outputs a reset notification signal to the microcomputer for notifying a reset in advance. According to such a construction, the microcomputer can recognize a possibility of resetting after receiving a reset notification signal subsequently.

When receiving the reset notification signal, for example, the microcomputer may store information indicating the signal reception in rewritable nonvolatile memory such as EEPROM or flash memory. When the microcomputer is actually reset and restarts, the microcomputer can read the information from the rewritable nonvolatile memory and recognize that a decrease in the operating voltage caused the reset. When receiving the reset notification signal, the microcomputer may allow the rewritable nonvolatile memory to save internal states such as data values, register values, and program counter values in the process of computation. When the microcomputer is actually reset and restarts, the microcomputer can read the saved data from the rewritable nonvolatile memory to restart from the same state as that before the reset.

When detecting that the intermediate voltage output from the first regulator becomes lower than an operation stop determining voltage set to be higher than the reset determining voltage, the fail-safe means outputs an operation stop signal to the microcomputer for stopping an operation of the microcomputer. Before the operating voltage for the microcomputer core becomes unstable, such a construction can stop operating the microcomputer, reliably prevent a malfunction, and improve the control reliability.

When detecting that the intermediate voltage output from the first regulator becomes lower than a reset notification determining voltage set to be higher than the reset determining voltage and lower than the write inhibit determining voltage, the fail-safe means outputs a reset notification signal to the microcomputer for notifying a reset in advance. When receiving the reset notification signal in such a construction, the microcomputer needs only to write information to any memory different from the above-mentioned specific memory.

When detecting that the intermediate voltage output from the first regulator becomes lower than an operation stop determining voltage set to be higher than the reset determining voltage and lower than the reset notification determining voltage, the fail-safe means outputs an operation stop signal for stopping an operation of the microcomputer.

When the intermediate voltage decreases in the above described power supply apparatus, the write inhibit signal is first output to the microcomputer. When the intermediate voltage further decreases, the reset notification signal is then output. When the intermediate voltage moreover decreases, the operation stop signal is output. When the intermediate voltage furthermore decreases, the reset signal is output. The respective signals are output stepwise in accordance with the degrees of decrease in the intermediate voltage. A fail-safe solution other than the reset can be used when the intermediate voltage decreases but is not lower than the reset determining voltage.

The exemplary power supply apparatus can further include a third regulator and a voltage drop detection means. The third regulator steps down the intermediate voltage output from the first regulator to generate a voltage higher than an operating voltage for the core and supplies the voltage to a power supply target other than the core. The voltage drop detection means detects a decrease in the externally supplied power supply voltage. In such a power supply apparatus, when the voltage drop detection means does not detect a decrease in the power supply voltage, the fail-safe means monitors an output voltage from the third regulator instead of the intermediate voltage from the first regulator When the output voltage is detected to become lower than a specified voltage, the fail-safe means outputs a reset signal to the microcomputer.

The exemplary power supply apparatus further monitors the intermediate voltage from the first regulator only when the external power supply voltage decreases. Such decrease especially requires a fast response to reset the microcomputer. Otherwise, the exemplary power supply apparatus monitors output voltages from the series regulator parallel to the series regulator so as to reset the microcomputer.

The exemplary power supply apparatus eliminates the possibility that the microcomputer may be easily reset due to a temporary decrease in an output voltage from the first regulator independently of a decrease in the external power supply voltage. That is, the exemplary power supply apparatus eliminates the possibility that the microcomputer may be reset even though the output voltage from the first regulator decreases and then soon increases and an operating voltage from the second regulator to the microcomputer core does not become lower than the minimum operating voltage. Consequently, it is possible to prevent deterioration of a minimum operating voltage for the ECU provided with the power supply apparatus, namely, to prevent an increase in the minimum value for an external power supply voltage that enables continuous operations of the microcomputer.

For example, the voltage drop detection means may monitor an external power supply voltage and, when the voltage becomes less than or equal to a specified value higher than the reset determining voltage, determine that the external power supply voltage decreases. Further, the voltage drop detection means may determine activation of a specific electric load causing a decrease in the external power supply voltage and, when the electric load is activated, determine that the external power supply voltage decreases.

The fail-safe means can have a low-pass filter circuit supplied with the intermediate voltage from the first regulator and can thereby monitor an output voltage from the low-pass filter as the intermediate voltage. According to such a construction, the fail-safe means can avoid an erratic determination due to a noise. When a switching regulator is used as the first regulator, a pulsation occurs in an output voltage or an intermediate voltage from the regulator. The power supply apparatus can monitor the voltage with the pulsation stabilized and can thus avoid a situation where a minimum value or a minimum peak value for the pulsation becomes smaller than the reset determining voltage to reset the microcomputer. As a result, the power supply apparatus can avoid degradation of the minimum operating voltage for an ECU provided with the power supply apparatus.

BRIEF DESCRIPTION OF THE DRAWINGS

Other objects, features and characteristics of the present invention will be appreciated and become apparent to those of ordinary skill in the art and all of which form a part of the present application. In the drawings.

DETAILED DESCRIPTION OF THE EXEMPLARY EMBODIMENTS

The following describes the power supply apparatus according to the present embodiment in detail with reference to the drawings.

Figure 1:
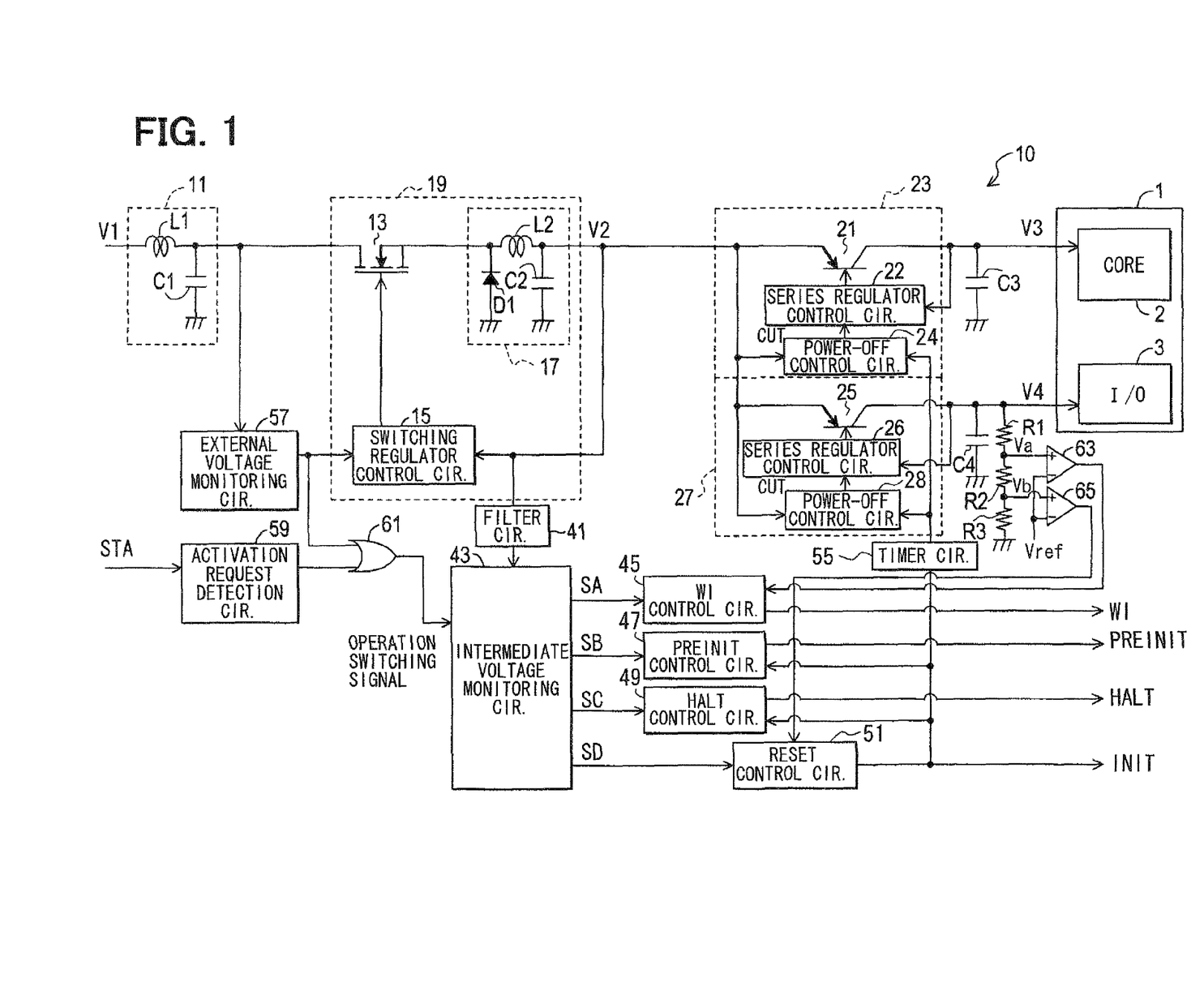
FIG. 1 is a circuit diagram illustrating a construction of a power supply apparatus according to an exemplary embodiment.

The power supply apparatus 10 according to the present embodiment, for example as illustrated in FIG. 1, is provided for an onboard electronic control unit (ECU) and supplies an operating voltage to the microcomputer 1 in the ECU. A battery voltage is supplied via an ignition switch or a relay, though not shown for simplicity. The power supply apparatus 10 supplies external power supply voltage V1 from the battery voltage. From the power supply voltage V1, the power supply apparatus 10 generates and outputs the operating voltage V3 for the core 2 of the microcomputer 1 and the operating voltage V4 for the I/O port 3 of the microcomputer 1. Also in the present embodiment, the operating voltage V3 is set to 1.2 V and the operating voltage V is set to 5 V.

FIG. 1 uses the same reference numerals as those for the corresponding parts of the power supply apparatus 100 in FIG. 4 and a detailed description is omitted for simplicity. The following mainly describes differences from the conventional power supply apparatus 100 in FIG. 4 and the exemplary power supply apparatus 10 of various embodiments.

Compared to the power supply apparatus 100 in FIG. 4, the power supply apparatus 10 according to the present embodiment uses a reset control circuit 51 instead of the reset control circuit 30. A power-off control circuit 24 is added to the series regulator 23 for outputting the voltage V3. A power-off control circuit 28 is added to the series regulator 27 for outputting the voltage V4.

The power supply apparatus 10 is additionally provided with a filter circuit 41, an intermediate voltage monitoring circuit 43, a WI control circuit 45, a PREINIT control circuit 47, a HALT control circuit 49, a timer circuit 55, an external voltage monitoring circuit 57, an activation request detection circuit 59, an OR circuit 61, resistors R1 through R3, and comparators 63 and 65.

The external voltage monitoring circuit 57 monitors the power supply voltage V1 passing through the smoothing circuit 11. When detecting that the power supply voltage V1 becomes lower than a specified voltage VL, the external voltage monitoring circuit 57 outputs a high-level voltage drop detection signal. According to the present embodiment, the high-level voltage drop detection signal is output only while V1 is less than or equal to VL.

When the external voltage monitoring circuit 57 outputs the voltage drop detection signal, the switching regulator 19 allows the switching regulator control circuit 15 to keep the switching transistor 13 turned on. The activation request detection circuit 59 monitors a starter signal that transitions to a high level when a starting switch is turned on to start a vehicle engine. When detecting that the starter signal transitions to a high level, the activation request detection circuit 59 outputs a high-level starter activation detection signal. According to the present embodiment, the high-level starter activation detection signal is output only while the starter signal remains high. Turning on the starting switch energizes a starter motor to crank the engine.

The OR circuit 61 is supplied with the voltage drop detection signal from the external voltage monitoring circuit 57 and the starter activation detection signal from the activation request detection circuit 59. The OR circuit 61 outputs an OR signal of both signals as an operation switching signal.

The filter circuit 41 is a low-pass filter circuit with a cut-off frequency set lower than a switching frequency of the switching transistor 13. The filter circuit 41 is supplied with the output voltage V2 as an intermediate voltage from the switching regulator 19. Consequently, the filter circuit 41 outputs the stabilized intermediate voltage V2 deprived of pulsation occurring in the intermediate voltage V2 from the switching regulator 19.

The intermediate voltage monitoring circuit 43 operates when the operation switching signal output from the OR circuit 61 transitions to a high level. That is, the intermediate voltage monitoring circuit 43 operates when the external voltage monitoring circuit 57 detects that the power supply voltage V1 becomes less than or equal to the specified voltage VL. Alternatively, the intermediate voltage monitoring circuit 43 operates when the activation request detection circuit 59 detects that the starter signal transitions to a high level.

The intermediate voltage monitoring circuit 43 monitors the intermediate voltage V2 output from the filter circuit 41 and performs the following operations. When detecting that the intermediate voltage V2 becomes lower than a write inhibit determining voltage VthA, the intermediate voltage monitoring circuit 43 changes an output signal SA to the WI control circuit 45 from low to high. When detecting that the intermediate voltage V2 becomes higher than a write enable voltage VthA' higher than VthA, the intermediate voltage monitoring circuit 43 returns the output signal SA from high to low.

When detecting that the intermediate voltage V2 becomes lower than a reset notification determining voltage VthB, the intermediate voltage monitoring circuit 43 supplies a high-level output signal SB to the PREINIT control circuit 47 only during the detection period.

When detecting that the intermediate voltage V2 becomes lower than an operation stop determining voltage VthC, the intermediate voltage monitoring circuit 43 changes an output signal SC to the HALT control circuit 49 from low to high only during the detection period.

When detecting that the intermediate voltage V2 becomes lower than a reset determining voltage VthD, the intermediate voltage monitoring circuit 43 changes an output signal SD to the reset control circuit 51 from low to high. When detecting that the intermediate voltage V2 becomes higher than a reset recovery voltage VthD' higher than VthD, the intermediate voltage monitoring circuit 43 returns the output signal SD from high to low.

Figure 2:
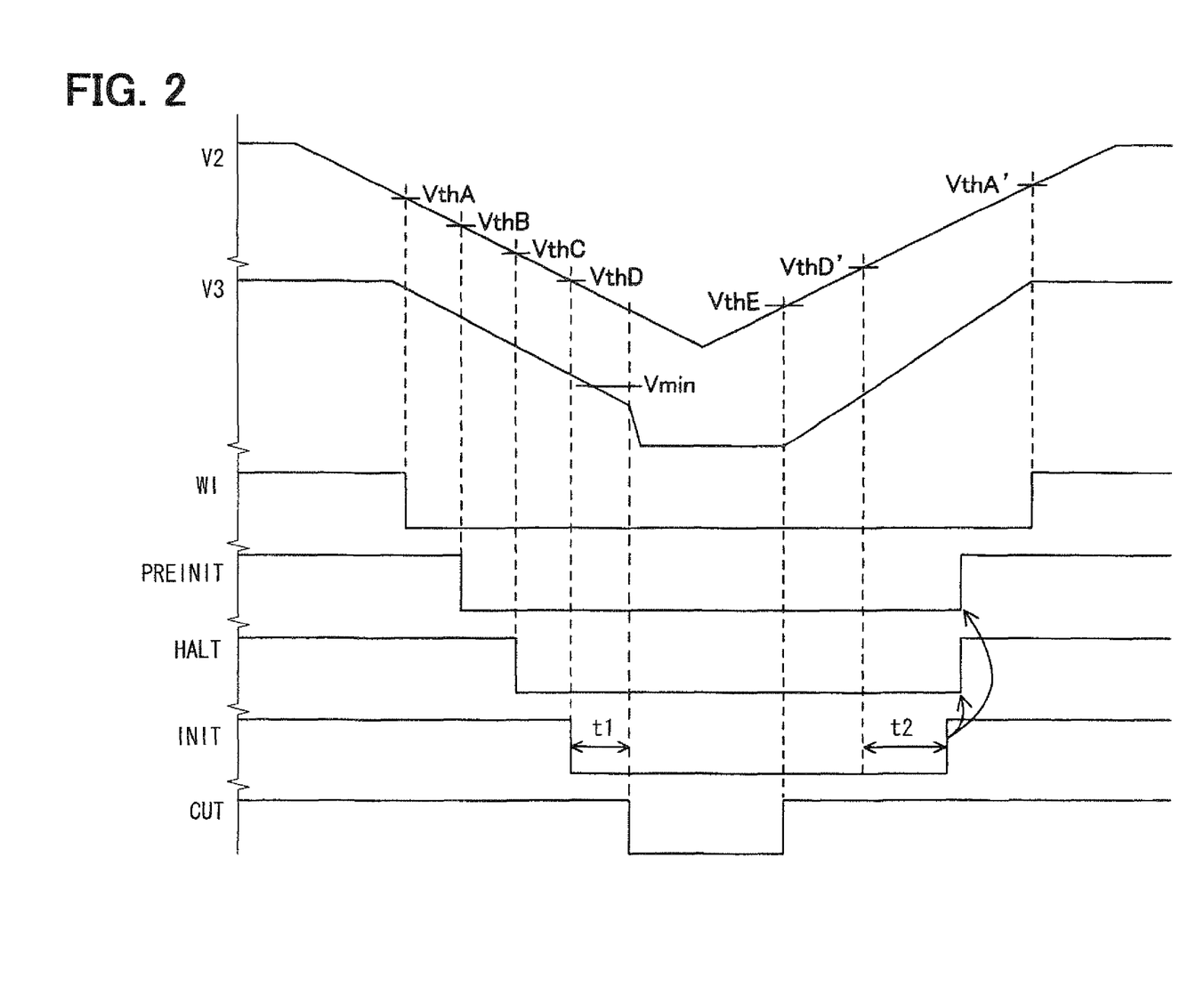
FIG. 2 is a timing diagram illustrating timing relationships associated with operation of an exemplary embodiment.

FIG. 2 shows the magnitude relation between the voltages in the order of VthA'>VthA>VthB>VthC>VthD'>VthD. The reset determining voltage VthD as the smallest value is set to the minimum output voltage V2 or slightly higher from the switching regulator 19. The minimum output voltage V2 is capable of causing the output voltage V3 from the series regulator 23 to be greater than or equal to the minimum operating voltage Vmin for the microcomputer core 2.

It should be noted that, in the description herein, reference is made to a signal being output or signal output being stopped or inhibited. Such description can refer, for example in the case of a signal being output, to an active state of the signal being applied, such as a low state for an active-low signal. Reference to a signal being stopped or inhibited can refer, for example, to the active state of the signal being reversed or changed, such as a transition to a high state for an active-low signal, or the like.

When the operation switching signal output from the OR circuit 61 transitions to a high level to operate the intermediate voltage monitoring circuit 43, the WI control circuit 45, the PREINIT circuit 47, the HALT control circuit 49, the reset control circuit 51, the timer circuit 55, and the power-off control circuits 24 and 28 operate as follows.

While the output signal SA from the intermediate voltage monitoring circuit 43 is high, the WI control circuit 45 outputs an active-low write inhibit signal WI to the microcomputer 1. As shown in FIG. 2, the write inhibit signal WI is output to the microcomputer 1 after the intermediate voltage V2 becomes lower than the write inhibit determining voltage VthA until the intermediate voltage V2 becomes higher than the write enable voltage VthA'. The write inhibit signal WI inhibits the core 2 from accessing memory in the microcomputer 1, namely writing data to the memory.

The reset control circuit 51 outputs the reset signal INIT to the microcomputer 1 when an output signal SD from the intermediate voltage monitoring circuit 43 transitions to a high level. The reset control circuit 51 starts measuring a reset recovery time t2 when the output signal SD returns to low. The reset control circuit 51 stops outputting the reset signal INIT after the reset recovery time t2 expires. The reset signal INIT is also active-low.

As shown in FIG. 2, the reset signal INIT is output to the microcomputer 1 during a period in which the intermediate voltage V2 becomes lower than the reset determining voltage VthD and extending through when the intermediate voltage V2 becomes higher than the reset recovery voltage VthD' while the reset recovery time t2 elapses. After the reset recovery time t2 elapses, the INIT signal goes high and is therefore no longer active.

The PREINIT control circuit 47 outputs a reset notification signal PREINIT to the microcomputer 1 when an output signal SB from the intermediate voltage monitoring circuit 43 transitions to a high level. When the reset control circuit 51 outputs the reset signal INIT while the output signal SB is high, the PREINIT control circuit 47 determines whether or not the output of the reset signal INIT stops. The PREINIT control circuit 47 stops outputting the reset notification signal PREINIT when detecting that the output of the reset signal INIT stops. The PREINIT control circuit 47 stops outputting the reset notification signal PREINIT when the output signal SB returns to low from high though the reset control circuit 51 does not output the reset signal INIT The reset notification signal PREINIT is active-low and functions to notify the microcomputer 1 of the reset in advance.

As shown in FIG. 2, the reset notification signal PREINIT is output to the microcomputer 1 after the intermediate voltage V2 becomes lower than the reset notification determining voltage VthB and based on monitoring the INIT signal condition. When the voltage level of intermediate voltage V2 becomes lower than the reset determining voltage VthD, the reset signal INIT becomes active. In the event that the intermediate voltage V2 does not become lower than reset determining voltage VthD, the reset notification signal PREINIT is output to the microcomputer 1 whenever the level of the intermediate voltage V2 is lower than the reset notification determining voltage VthB.

The HALT control circuit 49 outputs an operation stop signal HALT to the microcomputer 1 when the output signal SC from the intermediate voltage monitoring circuit 43 transitions to a high level and based on monitoring the INIT signal condition. When the reset control circuit 51 outputs a reset signal INIT while the output signal SC is high, the HALT control circuit 49 determines whether the output of the reset signal INIT has been inhibited. The HALT control circuit 49 stops output of the operation stop signal HALT when detecting that the output of the reset signal UNIT has been stopped. The HALT control circuit 49 stops outputting the operation stop signal HALT when the output signal SC returns to low from high though the reset control circuit 51 does not output the reset signal INIT. The operation stop signal HALT is active-low for stopping operations of the microcomputer 1.

When the intermediate voltage V2 becomes lower than the reset determining voltage VthD as shown in FIG. 2, the operation stop signal HALT is output to the microcomputer 1 after the intermediate voltage V2 becomes lower than the operation stop determining voltage VthC until the output of the reset signal INIT stops. When the intermediate voltage V2 does not become lower than the reset determining voltage VthD, though not shown, the operation stop signal HALT is output to the microcomputer 1 only while the intermediate voltage V2 is lower than the operation stop determining voltage VthC.

The timer circuit 55 starts measuring a time t1 when the reset control circuit 51 outputs the reset signal INIT After the time t1 elapses, the timer circuit 55 outputs a power-off request signal to the power-off control circuits 24 and 28 of series regulators 23 and 27.

When receiving the power-off request signal from the timer circuit 55, the power-off control circuit 24 outputs a power-off signal CUT to the series regulator control circuit 22. The power-off control circuit 24 outputs the power-off signal CUT when detecting that the output voltage V2 from the switching regulator 19 is greater than or equal to a power-off recovery signal VthE. As shown in FIG. 2, the power-off recovery signal VthE is set smaller than the reset determining voltage VthD. While supplied with the power-off signal CUT from the power-off control circuit 24, the series regulator control circuit 22 keeps the transistor 21 off and stops outputting the voltage V3, namely stops operating the series regulator 23.

The power-off control circuit 28 operates similarly to the power-off control circuit 24. While supplied with the power-off signal CUT from the power-off control circuit 28, the series regulator control circuit 26 keeps the transistor 25 off and stops outputting the voltage V4, namely stops operating the series regulator 27. The power-off control circuits 24 and 28 may be constructed not to output the power-off signal CUT when V2 is not smaller than VthE at the instant of receiving the power-off request signal from the timer circuit 55.

When the intermediate voltage monitoring circuit 43 operates according to the above-mentioned construction, let us suppose that the intermediate voltage V2 from the switching regulator 19 decreases from a target value of 6 V to smaller than the power-off recovery signal VthE as shown in FIG. 2. When V2 becomes smaller than VthA, the WI control circuit 45 outputs the write inhibit signal WI to the microcomputer 1.

When V2 becomes smaller than VthB, the PREINIT control circuit 47 outputs the reset notification signal PREINIT to the microcomputer 1. When V2 becomes smaller than VthC, the HALT control circuit 49 outputs the operation stop signal HALT to the microcomputer 1.

When V2 becomes smaller than VthD, the reset control circuit 51 outputs the reset signal INIT to the microcomputer 1. After the time t1 elapses from the point in time where V2 becomes smaller than VthD, the series regulators 23 and 27 stop operations, almost zeroing the voltages V3 and V4 supplied to the microcomputer 1.

The series regulators 23 and 27 restart operations when the output voltage V2 from the switching regulator 19 rises to be greater than or equal to the power-off recovery signal VthE.

The reset control circuit 51 stops outputting the reset signal INIT to the microcomputer 1 after a recovery time t2 has elapsed from when V2 becomes greater than VthD'. The HALT control circuit 49 stops outputting the operation stop signal HALT to the microcomputer 1. The PREINIT stops outputting the reset notification signal PREINIT to the microcomputer 1. When V2 becomes greater than VthA' afterwards, the WI control circuit 45 also stops outputting the write inhibit signal WI to the microcomputer 1.

In the power supply apparatus 10, the resistors R1 through R3 and the comparators 63 and 65 provide a monitoring circuit for monitoring the voltage V4. The resistors R1 through R3 are serially connected in the order of R1, R2, and R3 between a wiring line for the voltage V4 and a ground line set to zero volts. The comparator 63 compares a divided voltage Va with a reference voltage Vref between the resistors R1 and R2. The comparator 63 generates a low output when Va is smaller than Vref. Similarly, the comparator 63 compares a divided voltage Vb with a reference voltage Vref between the resistors R2 and R3. The comparator 63 generates a low output when Vb is smaller than Vref.

Let us suppose Vlim to be a value of the voltage V4 when the power supply voltage V1 and the intermediate voltage V2 decrease to cause the voltage V3 to be the minimum operating voltage Vmin for the core 2. Values of the resistors R1 through R3 and the reference voltage Vref are configured as follows. Va becomes smaller than Vref when the voltage V4 becomes lower than a first specified voltage Vr1 that is slightly higher than Vlim. Vb becomes smaller than Vref when the voltage V4 becomes lower than a second specified voltage Vr2 that is lower than the first specified voltage Vr1 and higher than Vlim.

The WI control circuit 45 and the reset control circuit 51 operate as follows when the operation switching signal output from the OR circuit 61 is low and the intermediate voltage monitoring circuit 43 does not operate.

The WI control circuit 45 outputs the write inhibit signal WI to the microcomputer 1 while an output signal from the comparator 63 is low, that is, while V4 is smaller than Vr1. The reset control circuit 51 outputs the reset signal INIT to the microcomputer 1 when an output signal from the comparator 65 becomes low, that is, when V4 is smaller than Vr2. When the output signal from the comparator 65 returns to high, that is, when V4 is greater than or equal to Vr, the reset control circuit 51 stops outputting the reset signal INIT at the point where the reset recovery time t2 elapses. When the intermediate voltage monitoring circuit 43 does not operate, the resistors R1 through R3, the comparator 65, and the reset control circuit 51 function similarly to the reset control circuit 30 of the power supply apparatus 100 in FIG. 4.

Figure 3:
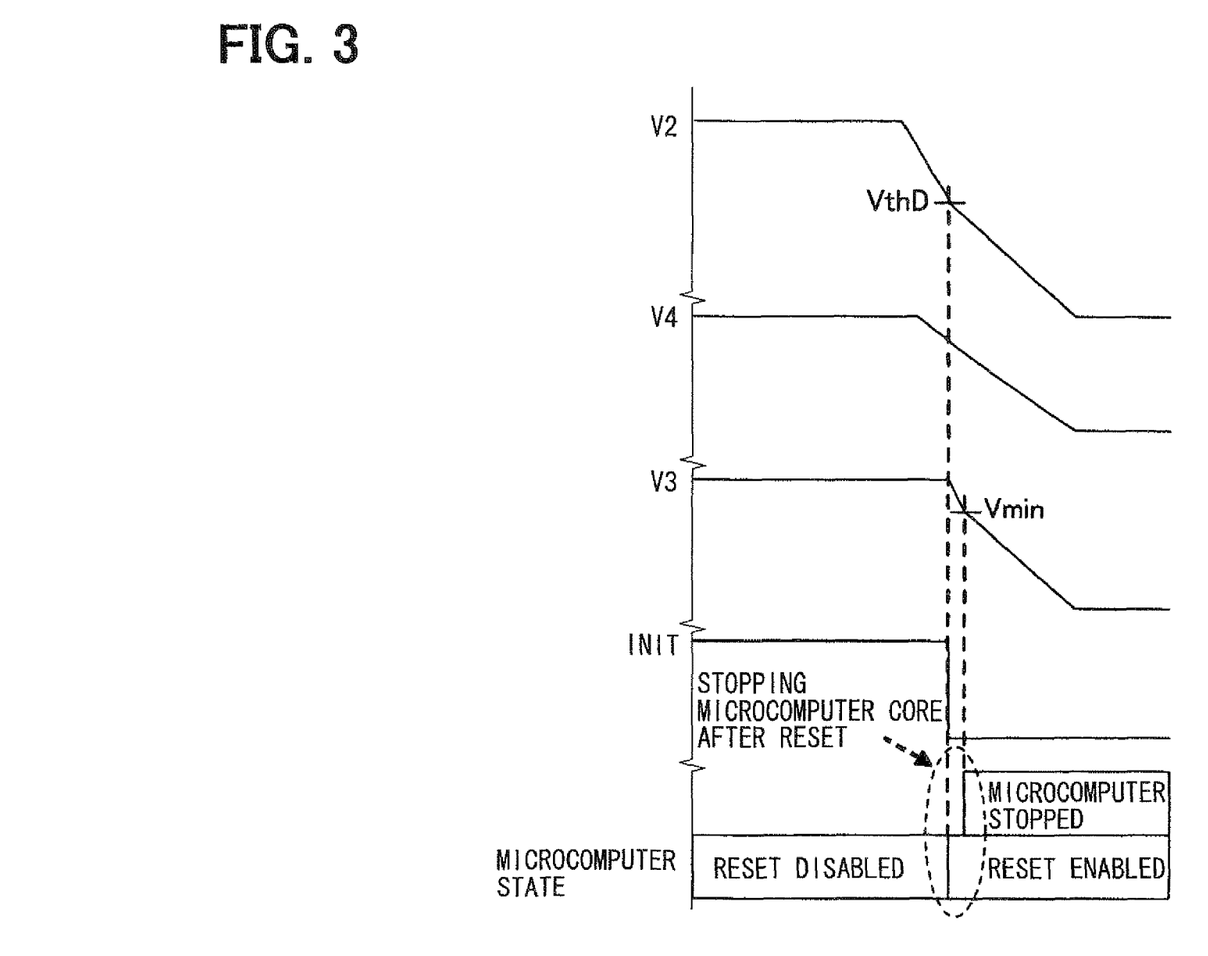
FIG. 3 is a timing diagram illustrating a timing effect of an exemplary embodiment.

The power supply apparatus 10 according to the present embodiment is constructed to monitor the intermediate voltage V2 output from the upstream switching regulator 19. As shown in FIG. 3, the power supply apparatus 10 can reset the microcomputer 1 when the external power supply voltage V1 decreases due to an instantaneous interruption and the intermediate voltage V2 accordingly decreases to be lower than the reset determining voltage VthD. The power supply apparatus 10 can ensure more improved response to resetting the microcomputer 1 than the conventional power supply apparatus 100.

Even when the core 2 of the microcomputer 1 consumes a large current, the power supply apparatus 10 can reset the microcomputer 1 to prevent the core 2 from erratically operating before the output voltage from the series regulator 23 becomes lower than the minimum operating voltage Vmin for the core 2 as shown in FIG. 3. As a result, it is possible to prevent data from being destroyed or the microcomputer 2 from being damaged.

According to the present embodiment, the series regulators 23 and 27 stop operating when the intermediate voltage V2 becomes lower than the reset determining voltage VthD to reset the microcomputer 1.

There is no need for unnecessary power supply to the microcomputer 1, making it possible to more reliably prevent the microcomputer 1 from erratically operating. According to the above-mentioned constructions, resetting the microcomputer 1 causes the operating voltage for standby memory to be smaller than the operating voltage V3 for the core 2. A shoot-through current flows from the core 2 to the standby memory. The embodiment can prevent such phenomenon from occurring and eliminate a possibility of damaging the microcomputer 1.

For example, the memory regulator in the above described construction is available as a series regulator that generates and outputs an operating voltage for the standby memory from a voltage at a power supply terminal where the battery voltage is always supplied. The power supply terminal is included in terminals for the onboard power supply apparatus. When the battery voltage decreases due to an activated electric load in such a construction, the power supply voltage V1 to the switching regulator 19 decreases to decrease the output voltage V3 from the series regulator 23. An output voltage from the series regulator as the memory regulator may also decrease.

According to the present embodiment, the write inhibit signal WI is output to the microcomputer 1 when the intermediate voltage V2 is detected to become lower than the write inhibit determining voltage VthA set to be higher than the reset determining voltage VthD. Before the operating voltage V3 for the microcomputer core 2 becomes unstable, it is possible to inhibit data from being written to the internal memory of the microcomputer 1 and more reliably prevent destruction of data stored in the internal memory.

According to the present embodiment, the reset notification signal PREINIT is output to the microcomputer 1 when the intermediate voltage V2 is detected to become lower than the reset notification determining voltage VthB that is set to be higher than the reset determining voltage VthD and lower than the write inhibit determining voltage VthA. Based on the reset notification signal PREINIT, the microcomputer 1 can recognize a possibility of subsequent resetting.

When receiving the reset notification signal PREINIT, the microcomputer 1 may store information indicating reception of the signal PREINIT in external rewritable nonvolatile memory such as EEPROM or flash memory, for example. When the microcomputer 1 is actually reset to restart afterwards, the microcomputer 1 can read the information from the rewritable nonvolatile memory to recognize that a decrease in the operating voltage V3 caused the reset. When receiving the reset notification signal PREINIT, the microcomputer 1 may save internal states of the built-in memory in the external rewritable nonvolatile memory. The internal states include data values, register values, and program counter values in the process of computation. When the microcomputer 1 is actually reset to restart afterwards, the microcomputer 1 can read the saved data from the rewritable nonvolatile memory to restart from the same state as that before the reset.

According to the present embodiment, the operation stop signal HALT is output to the microcomputer 1 when the intermediate voltage V2 becomes lower than the operation stop determining voltage VthC that is set to be higher than the reset determining voltage VthD and lower than the reset notification determining voltage VthB. Before the operating voltage V3 for the microcomputer core 2 becomes unstable, it is possible to stop operating the microcomputer 1, more reliably prevent a malfunction, and improve the control reliability.

When the intermediate voltage V2 decreases according to the present embodiment, the write inhibit signal WI is first output to the microcomputer 1 as shown in FIG. 2. When the intermediate voltage V2 further decreases, the reset notification signal PREINIT is then output. When the intermediate voltage V2 moreover decreases, the operation stop signal HALT is output. When the intermediate voltage V2 furthermore decreases, the reset signal INIT is output. The respective signals are output stepwise in accordance with the degrees of decrease in the intermediate voltage V2. A fail-safe solution other than the reset can be used when the intermediate voltage V2 decreases but is not lower than the reset determining voltage VthD.

According to the present embodiment, the intermediate voltage monitoring circuit 43 operates when the external voltage monitoring circuit 57 detects the power supply voltage V1 to be less than or equal to the specified voltage VL or when the activation request detection circuit 59 detects the starter signal to be high and the operation switching signal output from the OR circuit 61 is high. Otherwise, the circuit including the resistors R1 through R3 and the comparators 63 and 65 monitors the output voltage V4 from the series regulator 27 and outputs the write inhibit signal WI and the reset signal INIT to the microcomputer 1. That is, the power supply apparatus 10 monitors the intermediate voltage V2 from the switching regulator 19 only when the external power supply voltage V1 decreases. Such decrease especially requires a fast response to reset the microcomputer. Otherwise, the power supply apparatus 10 monitors the output voltage V4 from the series regulator 27 parallel to the series regulator 23 so as to reset the microcomputer 1.

The power supply apparatus 10 eliminates the possibility that the microcomputer 1 may be easily reset due to a temporary decrease in an output voltage from the switching regulator 19 independently of a decrease in the external power supply voltage V1. That is, the power supply apparatus 10 eliminates the possibility that the microcomputer 1 may be reset even though the output voltage V2 from the switching regulator 19 decreases and then soon increases and the output voltage V3 from the series regulator 23 does not become lower than the minimum operating voltage Vmin for the microcomputer core 2. Consequently, it is possible to prevent deterioration of a minimum operating voltage for the ECU provided with the power supply apparatus 10, namely, to prevent an increase in the minimum value for the external power supply voltage V1 that enables continuous operations of the microcomputer 1.

The external voltage monitoring circuit 57 compares the power supply voltage V1 with the specified voltage VL for magnitude. The specified voltage VL is set to a value of the power supply voltage V1 when the output voltage V2 from the switching regulator 19 becomes slightly higher than the write inhibit determining voltage VthA.

According to the present embodiment, the filter circuit 41 is provided. The intermediate voltage monitoring circuit 43 monitors the intermediate voltage V2 passing through the filter circuit 41, making it possible to avoid an erratic determination due to a noise or pulsation occurring on an output line for the switching regulator 19. When the filter circuit 41 is not provided, switching the transistor 13 causes a minimum value or a minimum peak value for the pulsation occurring in the intermediate voltage V2 to be smaller than the reset determining voltage VthD and may unnecessarily reset the microcomputer 1. The use of the filter circuit 41 eliminates such possibility and can avoid degradation of the minimum operating voltage for the ECU provided with the power supply apparatus 10.

When the external voltage monitoring circuit 57 detects that the power supply voltage V1 becomes less than or equal to the specified voltage VL, the switching regulator control circuit 15 keeps the transistor 13 turned on according to the present embodiment.

When V1 becomes less than or equal to VL, the output voltage V2 from the switching regulator 19 almost equals the external power supply voltage V1 without pulsation. It is possible to more reliably avoid degradation of the minimum operating voltage for the ECU provided with the power supply apparatus 10.

In the above-mentioned embodiment, the switching regulator 19 is equivalent to a first regulator. The series regulator 23 is equivalent to a second regulator. The series regulator 27 is equivalent to a third regulator. The I/O port of the microcomputer 1 is equivalent to a power supply target other than the core. The filter circuit 41, the intermediate voltage monitoring circuit 43, the WI control circuit 45, the PREINIT control circuit 47, the HALT control circuit 49, the reset control circuit 51, the timer circuit 55, the power-off control circuits 24 and 28, the resistors R1 through R3, and the comparators 63 and 65 are equivalent to a fail-safe means. The external voltage monitoring circuit 57, the activation request detection circuit 59, and the OR circuit 61 are equivalent to a voltage drop detection means.

While there has been described the specific embodiment of the present invention, it is to be distinctly understood that the present invention is not limited thereto but may be otherwise variously embodied within the spirit and scope of the invention.

For example, it is possible to monitor only the intermediate voltage V2 by removing the monitoring circuit for the voltage V4 including the resistors R1 through R3 and the comparators 63 and 65 and always operating the intermediate voltage monitoring circuit 43. In such a case, the activation request detection circuit 59 and the OR circuit 61 can be also removed.

In addition to the construction of always operating the intermediate voltage monitoring circuit 43, the reset control circuit 51 can be constructed to output the reset signal INIT to the microcomputer 1 when the output signal SD from the intermediate voltage monitoring circuit 43 becomes active high, that is, when V2 becomes smaller than the reset determining voltage VthD, or when the output signal from the comparator 65 becomes active low, that is, when V4 becomes smaller than the second specified voltage Vr2. In such a case, the reset signal INIT can be released as follows. For example, the output of the reset signal INIT may be stopped at the point where the reset recovery time t2 elapses after one instance of the output signal SD from the intermediate voltage monitoring circuit 43 and the output signal from the comparator 65 that caused the output of the reset signal INIT returns to be inactive as the original state.

Still further, in the case where the series regulator may be provided instead of the switching regulator 19, the filter circuit 41 can be removed.

What is claimed is:

1. A power supply apparatus comprising:
a first regulator that steps down an externally input power supply voltage to generate an intermediate voltage;
a second regulator that steps down the intermediate voltage to generate an operating voltage for operating a core of a microcomputer core and supplies the operating voltage to the core of the microcomputer; and
a fail-safe means for monitoring the intermediate voltage and, when detecting that the intermediate voltage becomes lower than a reset determining voltage, outputting a reset signal to the microcomputer so as to reset the microcomputer, wherein:
the fail-safe means includes a low-pass filter circuit supplied with the intermediate voltage and monitors an output voltage from the low-pass filter as the intermediate voltage; and
the low-pass filter circuit is configured to avoid an erratic determination by the fail-safe means.

2. The power supply apparatus of claim 1,
wherein the fail-safe means outputs the reset signal and then stops the second regulator.

3. The power supply apparatus of claim 1,
wherein, when detecting that the intermediate voltage becomes lower than a write inhibit determining voltage set to be higher than the reset determining voltage, the fail-safe means outputs a write inhibit signal to the microcomputer for preventing the core from writing data to specific memory.

4. The power supply apparatus of claim 1,
wherein, when detecting that the intermediate voltage becomes lower than a reset notification determining voltage set to be higher than the reset determining voltage, the fail-safe means outputs a reset notification signal to the microcomputer for proving a notification of a reset in advance.

5. The power supply apparatus of claim 1,
wherein, when detecting that the intermediate voltage becomes lower than an operation stop determining voltage set to be higher than the reset determining voltage, the fail-safe means outputs an operation stop signal to the microcomputer for stopping an operation of the microcomputer.

6. The power supply apparatus of claim 3,
wherein, when detecting that the intermediate voltage becomes lower than a reset notification determining voltage set to be higher than the reset determining voltage and lower than the write inhibit determining voltage, the fail-safe means outputs a reset notification signal to the microcomputer for providing a notification of a reset in advance.

7. The power supply apparatus of claim 6,
wherein, when detecting that the intermediate voltage becomes lower than an operation stop determining voltage set to be higher than the reset determining voltage and lower than the reset notification determining voltage, the fail-safe means outputs an operation stop signal for stopping an operation of the microcomputer.

8. The power supply apparatus of claim 1, comprising:
a third regulator that steps down the intermediate voltage to generate a voltage higher than an operating voltage for the core and supplies the voltage to a power supply target other than the core; and
a voltage drop detection means for detecting a decrease in the externally supplied power supply voltage,
wherein, when the voltage drop detection means does not detect a decrease in the power supply voltage, the fail-safe means monitors an output voltage from the third regulator instead of the intermediate voltage and, when the output voltage is detected to become lower than a specified voltage, outputs a reset signal to the microcomputer.

9. A power supply apparatus comprising:
a regulator stepping down an intermediate voltage regulated from a power supply to generate an operating voltage associated with a core of a microcomputer;
a low-pass filter circuit that is supplied with the intermediate voltage; and
an intermediate voltage monitoring circuit configured to:
monitor an output voltage from the low-pass filter as the intermediate voltage; and
sequentially generate a series of intermediate control signals controlling progressively increasing reset states of the microcomputer, the control signals sequentially generated based on detecting that the intermediate voltage becomes lower than corresponding series of thresholds, wherein:
the low-pass filter circuit is configured to avoid an erratic determination by the intermediate voltage monitoring circuit.

10. The power supply apparatus of claim 9,
wherein a first one of the series of intermediate control signals includes an inhibit signal that inhibits the microcomputer core from writing to a microcomputer memory when the intermediate voltage crosses a first of the series of thresholds 11. The power supply apparatus of claim 9,
wherein a second one of the series of the intermediate control signals includes a reset notification signal that causes the microcomputer to store an internal state in an external memory before the microcomputer is reset when the intermediate voltage crosses a second of the series of thresholds.

12. The power supply apparatus of claim 9,
wherein a third one of the series of intermediate control signals includes a halt signal that causes the microcomputer to halt operation when the intermediate voltage crosses a third of the series of thresholds.

13. The power supply apparatus of claim 9,
wherein a fourth one of the series of intermediate control signals includes a reset signal that causes the microcomputer to reset when the intermediate voltage crosses a fourth of the series of thresholds.

14. The power supply apparatus of claim 13, further comprising a timer circuit coupled to the intermediate voltage monitoring circuit and the regulator, the timer circuit starting a power-off timer interval based on the reset signal, the regulator generating a power-off signal after the power-off timer interval elapses.

15. The power supply apparatus of claim 13, further comprising a timer circuit coupled to the intermediate voltage monitoring circuit and the regulator, the regulator further including a power-off control circuit and a regulator control circuit, the timer circuit starting a power-off timer interval based on the reset signal, the power-off control circuit generating a power off signal to the regulator control circuit after the power off timer interval elapses.

16. The power supply apparatus according to claim 1, further comprising:

a capacitor provided between a ground line and a wiring line for the operating voltage from the second regulator to the core, wherein the capacitor stabilizes the operating voltage.

17. The power supply apparatus according to claim 9, further comprising:
a capacitor provided between a ground line and a wiring line for the operating voltage from the second regulator to the core, wherein the capacitor stabilizes the operating voltage.

18. The power supply apparatus according to claim 1, further comprising:
a smoothing circuit configured to pass the externally input power supply voltage to the first regulator.

19. The power supply apparatus according to claim 9, further comprising:
a smoothing circuit configured to pass a voltage from the power supply to the regulator.

* * * * *